United States Patent
Ikeda

(10) Patent No.: US 10,846,400 B2
(45) Date of Patent: Nov. 24, 2020

(54) OUTPUT DEVICE, ANALYSIS DEVICE, AND RECORDING MEDIUM IN WHICH COMPUTER PROGRAM IS STORED

(71) Applicant: NEC Corporation, Tokyo (JP)

(72) Inventor: Satoshi Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 232 days.

(21) Appl. No.: 15/532,588

(22) PCT Filed: Dec. 8, 2015

(86) PCT No.: PCT/JP2015/006119
§ 371 (c)(1),
(2) Date: Jun. 2, 2017

(87) PCT Pub. No.: WO2016/092836
PCT Pub. Date: Jun. 16, 2016

(65) Prior Publication Data
US 2017/0329964 A1     Nov. 16, 2017

(30) Foreign Application Priority Data
Dec. 10, 2014   (JP) .................................. 2014-249567

(51) Int. Cl.
G06F 21/55     (2013.01)
H04L 29/06     (2006.01)

(52) U.S. Cl.
CPC ............ *G06F 21/55* (2013.01); *G06F 21/552* (2013.01); *H04L 63/029* (2013.01); *H04L 63/1425* (2013.01)

(58) Field of Classification Search
CPC ..... G06F 21/55; G06F 21/552; H04L 63/029; H04L 63/1425
See application file for complete search history.

(56) References Cited

U.S. PATENT DOCUMENTS 9,960,975 B1 * 5/2018 Van Horenbeeck ......................... H04L 63/1416
2002/0059078 A1 * 5/2002 Valdes ................ H04L 41/0631 705/1.1

(Continued)

FOREIGN PATENT DOCUMENTS

| JP | 2004-234401 A | 8/2004 |
| JP | 2008-176752 A | 7/2008 |
| JP | 4619254 B2 | 1/2011 |

OTHER PUBLICATIONS

Suzuki, Youhei et al., A Low Cost Worm Detection Technique Based on Flow Payload Similarity, 3rd International Conference on Web Information Systems and Technologies (WEBIST 2007) [online], Mar. 2007 [retrieval date Jan. 7, 2016].

(Continued)

*Primary Examiner* — Vance M Little

(57) ABSTRACT

The present invention provides an output device, etc., with which it is possible to present an alert indicating an abnormality of network to an operator in such a manner that the operator can determine the alert more efficiently. An output device is provided with a presentation unit which, when a first alert is notified in response to detection of an abnormality in a communication network to be monitored, presents similarity information representing similarity obtained on the basis of first information included in communication information that has caused the first alert and second information included in communication information related to one or a second alerts.

3 Claims, 13 Drawing Sheets

(56) References Cited

U.S. PATENT DOCUMENTS

| | | | |
|---|---|---|---|
| 2007/0130188 A1* | 6/2007 | Moon | G06F 21/64 |
| 2009/0164427 A1* | 6/2009 | Shields | H04L 63/12 |
| 2010/0115617 A1* | 5/2010 | Weber | H04L 63/1425 |
| | | | 726/23 |
| 2011/0067106 A1* | 3/2011 | Evans | G06F 21/552 |
| | | | 726/23 |
| 2011/0099351 A1* | 4/2011 | Condict | G06F 3/0608 |
| | | | 711/216 |

OTHER PUBLICATIONS

International Search Report for PCT Application No. PCT/JP2015/006119, dated Jan. 19, 2016.

English translation of Written opinion for PCT Application No. PCT/JP2015/006119.

* cited by examiner

Fig. 5

DETECTED ALERT LIST 26

| DETECTION TIME | TRANSMISSION SOURCE IP | TRANSMISSION DESTINATION IP | DETECTION RULE NAME | HASH VALUE | COLORING INFORMATION |
|---|---|---|---|---|---|
| 09:00:12 | 192.168.0.1 | 10.1.0.1 | portscan | 00 33 33 66 | |
| 09:00:13 | 192.168.0.2 | 10.1.0.1 | portscan | 00 33 33 66 | |
| 09:10:30 | 192.168.0.3 | 10.1.0.2 | directory traversal | ff 66 33 99 | |
| 09:11:10 | 192.168.0.3 | 10.1.0.3 | directory traversal | ff 66 00 99 | |
| 10:15:01 | 192.168.0.5 | 10.1.0.3 | directory traversal | ff 66 33 99 | |

Fig. 13

DETECTED ALERT LIST 39

| DETECTION TIME | TRANSMISSION SOURCE IP | TRANSMISSION DESTINATION IP | DETECTION RULE NAME | HASH VALUE | DISTANCE |
|---|---|---|---|---|---|
| 09:00:12 | 192.168.0.1 | 10.1.0.1 | portscan | 00 33 33 66 | 0 |
| 09:00:13 | 192.168.0.2 | 10.1.0.1 | portscan | 00 33 33 66 | 0 |
| 07:00:30 | 192.168.0.1 | 10.1.0.1 | portscan | 33 33 33 66 | 4 |
| 06:11:10 | 192.168.0.3 | 10.1.0.3 | ···· | 00 00 23 66 | 5 |
| 04:15:01 | 192.168.0.1 | 10.1.0.3 | ···· | 00 00 33 44 | 8 |
| | | | | | |
| | | | | | |

OUTPUT DEVICE, ANALYSIS DEVICE, AND RECORDING MEDIUM IN WHICH COMPUTER PROGRAM IS STORED

This application is a National Stage Entry of NUMBER: PCT/JP2015/006119 filed on Dec. 8, 2015, which claims priority from Japanese Patent Application 2014-249567 filed on Dec. 10, 2014, the contents of all of which are incorporated herein by reference, in their entirety.

TECHNICAL FIELD

The present invention relates to a technical field of monitoring a network to be monitored.

BACKGROUND ART

For preventing, for example, attacks from external communication networks or malicious third parties' unauthorized entries, a company network shuts down or monitors communications by means of firewalls and intrusion detection systems. In the following explanation of the present application, "communication network" may be simply expressed as "network." In addition, in the following explanation, "entry detection system" may be expressed as "IDS (intrusion detection system)."

Particularly in recent years, cases of targeted attacks aiming to steal information on intellectual property or confidential information of companies have been on the increase. In response, the demand for cyber security is increasing.

A general cyber security measure is to monitor the network to be monitored or address incidents by introducing a security operation center. In the following explanation, "security operation center" may be expressed as "SOC (security operation center)." For example, companies organize the SOC internally, or realize the SOC by outsourcing the operation of the SOC to outside companies.

More specifically, in an operation to monitor the network, the operation to classify an alert notified by a monitoring device such as a firewall or an IDS performs classification operations according to predetermined levels of risk is performed. Alerts include such an alert that indicates an attack from outside, alternatively include one which does not have any risk, for example. That is, not all alerts notified by the monitoring devices are required to be reported as incidents. Therefore, an operator who performs a monitoring operation confirms information included in the alert or refers to outside information. Then, the operator sets an appropriate risk level to the alert. The operator can report the alert as an incident if necessary. The alert information referred to in this classification operation includes the following information, for example. That is, the alert information includes a detection rule used in detecting abnormalities of the monitoring target, IP addresses and port numbers of hosts having performed transmission and reception, and information representing an importance level assigned to the detection rule by a security vendor. Note that "IP" is an abbreviated expression of "Internet protocol."

PTL 1 is an example related art disclosed before the present application. PTL 1 analyzes event data (alert information) notified by the IDS sensor provided on the network to be monitored. In this way, PTL 1 discloses a technique related to a system for analyzing an event and giving a warning to issue an alert.

This event analysis and warning system mechanically determines whether a communication event which is indicated by event data is an unauthorized access, based on the event data and the alert having been determined as indicating an unauthorized access in the past. More specifically, the event analysis and warning system compares a part or all of the items of the signature (detection rule), the IP address, and the port number included in the event data, with the alert having been determined as indicating the unauthorized access in the past. As a result, the event analysis and warning system determines whether the communication event is the unauthorized access, based on whether each of the items matches or is similar to the alert having been determined as indicating the unauthorized access.

CITATION LIST

Patent Literature

[PTL 1] Japanese Patent No. 4619254

SUMMARY OF INVENTION

Technical Problem

As described above, the communication monitoring system can assist operators' classification operation by analyzing typical items included in the alert. However, for an element having an atypical structure such as a payload included in a packet having caused the alert, the communication monitoring system requires visual inspection by the operator to determine the level of risk of the alert.

In addition, PTL 1 describes determining whether the communication event is the unauthorized access on the basis of the event data and the alert having been determined as indicating the unauthorized access in the past. However, in some cases, it is not sufficient to use whether event data matches or is similar to the alert, as a determination criterion in classifying alerts.

In the following explanation, the alert having been classified in the past is assumed to be the alert having been classified by as false detection, for example. In addition, the alert having been classified in the past is assumed to be classified on the basis of the detection rule and information representing the transmission source and the transmission destination of the communication event. In this case, according to the technique disclosed in PTL 1, even when those items related to the alert having been classified in the past matches those items related to the newly notified alert, it is not always possible to classify the newly notified alert as a false detection as well. That is, as the detection criterion, it is not sufficient to use the detection rule and information representing the transmission source and the transmission destination of the communication event.

In the following explanation, for facilitating the explanation, the communication monitoring system including the IDS is explained as an example. For example, in an operation to classify the alert, if the payload contained in the communication packet having been detected as an abnormality is not confirmed, the operator may not be able to make a final determination on the level of risk of the alert. More specifically, the communication monitoring system may assist the operator's classification operation by analyzing typical items included in an alert. However, for an element having an atypical structure such as the payload, the communication monitoring system requires visual inspection of the operator to determine the level of risk of the alert.

A main objective of the present invention is to provide a output device and the like that can present to the operator the alert indicating the abnormality of the network, in a manner by which more efficient determination is possible.

Solution to Problem

So as to solve the above-stated problem, an output device according to an aspect of the present invention includes:

presentation means for presenting, when a first alert is notified in response to detection of an abnormality in a communication network to be monitored, similarity information that is obtained based on first information included in communication information that has caused the first alert and second information included in communication information related to one or more second alerts having been notified prior to the first alert, the similarity information representing a similarity between the first alert and the second alert.

So as to solve the above-stated problem, an analysis device according to an aspect of the present invention includes:

analysis means that obtains, when a first alert is notified in response to detection of an abnormality in a communication network to be monitored, digested information included in a form in which a similarity between first information and second information is digested and is different from the first information and the second information, based on the first information and the second information, wherein the first information is included in communication information that has caused the first alert, and the second information is included in communication information related to one or more second alerts having been notified prior to the first alert.

This objective can also be achieved by a communication monitoring system including the above-described output device.

In addition, so as to achieve this objective, a presentation method according to an aspect of the present invention presents, when a first alert is notified in response to detection of an abnormality in a communication network to be monitored, similarity information that is obtained based on first information included in communication information that has caused the first alert and second information included in communication information related to one or more second alerts having been notified prior to the first alert, the similarity information representing a similarity between the first alert and the second alert.

Note that this objective can also be achieved by a computer program that realizes the output device having each of the above-described configurations and the method therefor by using a computer, and a computer-readable recording medium storing therein the computer program.

ADVANTAGEOUS EFFECTS OF INVENTION

The present invention can provide the output device and the like that can present to the operator the alert indicating an abnormality of the network in a mode by which more efficient determination is possible.

BRIEF DESCRIPTION OF DRAWINGS

FIG. 5 is a diagram specifically illustrating a mode in which information related to an alert is presented by the output device according to the second example embodiment of the present invention.

FIG. 13 is a diagram specifically illustrating a mode in which information related to an alert is presented by a presentation unit according to the third example embodiment of the present invention.

DESCRIPTION OF EMBODIMENTS

Figure 1:
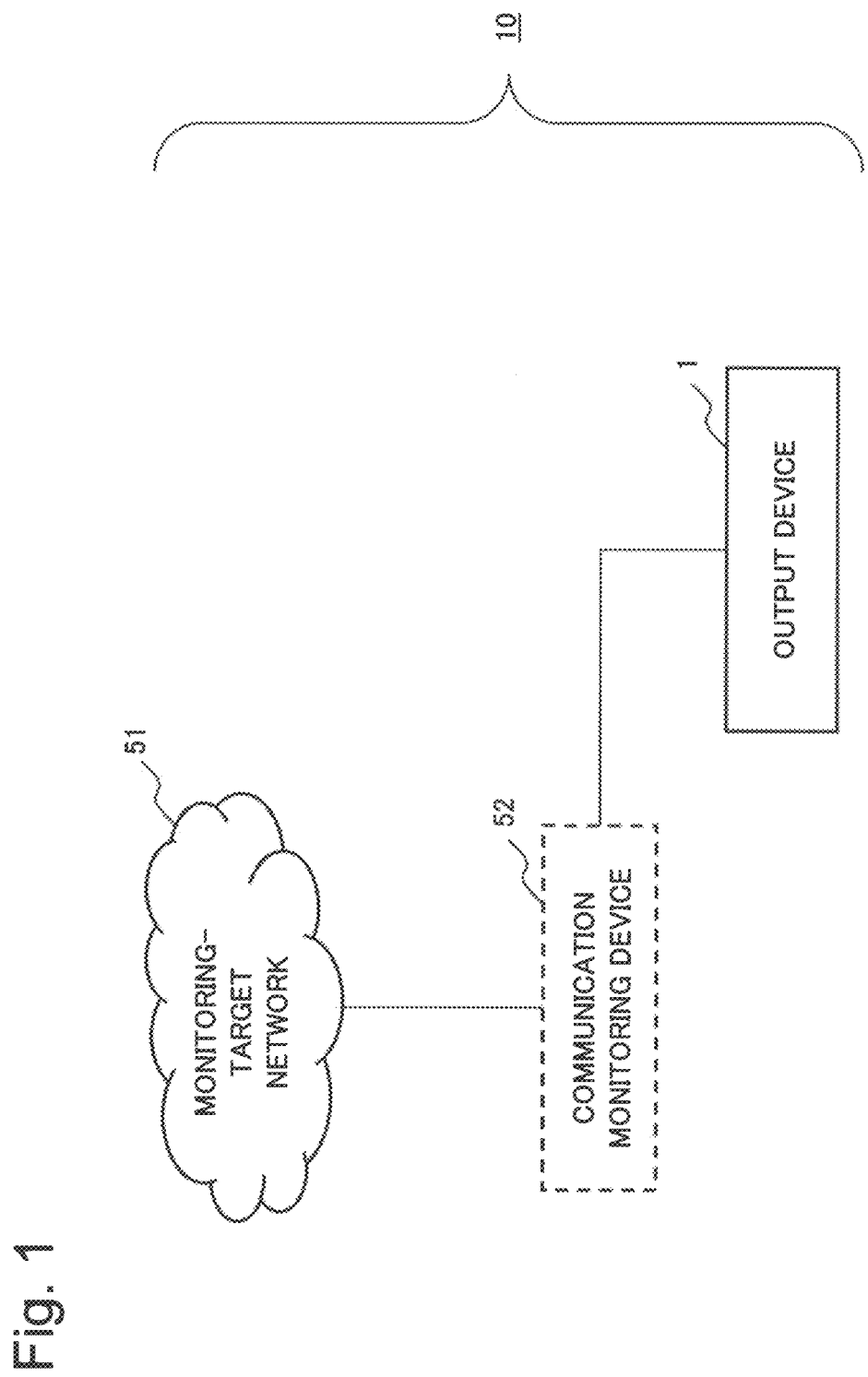
FIG. 1 is a block diagram illustrating a configuration of a communication monitoring system according to a first example embodiment of the present invention.

The following explains in detail the example embodiments of the present invention by referring to the drawings.

First Example Embodiment

Figure 2:
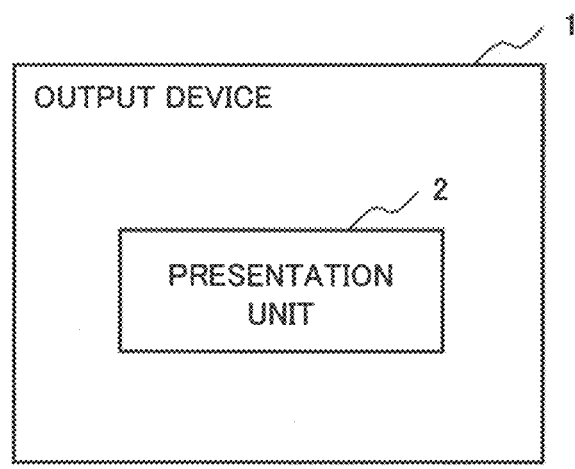
FIG. 2 is a block diagram illustrating a configuration of an output device according to the first example embodiment of the present invention.

FIG. 1 is a block diagram illustrating a configuration of a communication monitoring system 10 according to a first example embodiment of the present invention. FIG. 2 is a block diagram illustrating a configuration of an output device 1 according to the first example embodiment of the present invention.

FIG. 1, the communication monitoring system 10 broadly includes the output device 1, a monitoring-target network 51 that is to be monitored, and a communication monitoring device 52 that monitors the monitoring-target network 51. In FIG. 2, the output device 1 includes a presentation unit 2.

More specifically, the presentation unit 2 executes the following process, when an alert (first alert) is notified in response to detection of an abnormality in the monitoring-target network 51 to be monitored.

The presentation unit 2 has a function of presenting similarity information representing a similarity between the first alert and one or more alerts (second alert) notified in the past prior to the notification of the first alert. That is, the presentation unit 2 has the function of presenting the similarity information obtained based on first information included in communication information that has caused the first alert and second information included in communication information related to the second alert.

The above-described alert includes, for example, a detection time, an identifier that can identify a detection rule used in detecting an abnormality, an IP address and a port number of a transmission source of communication information that has caused the abnormality, and an IP address and a port number of a transmission destination host of the communication information. The detection time is information representing a time at which the communication monitoring device 52 detected the abnormality. Alternatively, the detection time may be information representing a date and time including a time at which the communication monitoring device 52 detected the abnormality. For facilitating the explanation, in the following explanation, even information representing the date and time including that time is expressed as "detection time."

In addition, the similarity information is information representing the similarity between the first alert and the second alert that is similar to the first alert.

More specifically, the similarity information includes digested information (digest value) that is different from the first information and the second information and that is included in a form in which the similarity between the first information and the second information is digested. That is, the similarity information at least includes digested information in which the similarity obtained based on the first information and the second information, wherein the digested information differs from the first information and the second information, and the digested information digestedly keeps the similarity between the first information and the second information. Other word, the similarity information differs from the first information and the second information, wherein the similarity between the first information and the second information are included in a digested form. In the present example embodiment, the first information is information included in communication information that has caused the first alert. The second information is information included in communication information related to the second alert. Concrete examples of the similarity information are explained later in detail in the second example embodiment.

In the present example embodiment, for facilitating the explanation, the presentation unit 2 is explained as having a configuration of presenting similarity information representing the similarity between the first alert and the second alert, as an example. However, the example embodiment of the present invention is not limited to the described configuration. The presentation unit 2 may further adopt a configuration of presenting a part or all of the information (alert information) related to the first alert. In that case, the presentation unit 2 may present a part or all of the alert information and the similarity information, as information related to the first alert. That is, the presentation unit 2 may at least present a part or all of the alert information and the similarity information, in a mode by which an operator can identify the information.

The above-described alert is information generated based on information included in the alert and an identifier that can identify the alert.

More specifically, alert information is assumed to include at least the following information for each alert, for example.

Alert identifier
Detection time,
Identifier that can identify the detection rule
IP address and port number of the transmission source of communication information that has caused an abnormality
IP address and port number of the transmission destination host of the communication information. That is, the alert information is information in which the detection time, the identifier of the detection rule, the IP address and the port number of the transmission source, the IP address and the port number of the transmission destination host are associated with each other, by using the alert identifier as a key.

In the following explanation, for facilitating the explanation, the "monitoring-target network 51" may be simply referred to as the "network 51". In addition, in the following explanation, the "first alert" and the "second alert" may be collectively referred to as "alert" (hereinafter, the same applies to each example embodiment).

The communication monitoring device 52 has a function of monitoring communication information flowing through the network 51. In addition, the communication monitoring device 52 detects attacks on the network 51 from outside based on the detection rule, for example. The communication monitoring device 52 notifies an analysis device (not illustrated; for example, the analysis device 22 illustrated in FIG. 3), of an alert indicating a newly detected abnormality. Then, the communication monitoring device 52 has a function of storing alert information related to an alert.

Any currently common technology may be adopted as a technology of the communication monitoring device 52 to detect an abnormality of the network 51 on the basis of the detection rule. Therefore, the detailed explanation of the present example embodiment is omitted (hereinafter, the same applies to each example embodiment).

The output device 1 according to the present example embodiment can present the alert indicating the abnormality of the network to the operator in a mode by which more efficient determination is possible. The reason therefor is described as follows.

That is, the output device 1 includes the presentation unit 2 that presents similarity information representing the similarity obtained based on the first information and the second information included in the communication information. According to this, the operator can easily determine the level of risk of the alert based on the similarity information. Accordingly, even when the level of risk cannot be determined solely by such information as the detection rule and the IP address of the host, the output device 1 can present to an operator the similarity information as a classification guidepost. For the stated reason, the operator can efficiently determine the level of risk in the operation to classify alerts.

Second Example Embodiment

Next, a second example embodiment based on the output device 1 according to the above-described first example embodiment of the present invention is explained. In the following explanation, the characteristic portions of the present example embodiment are mainly explained. In the following explanation, each configuration that is similar to the corresponding configuration of the above-described example embodiments is assigned the same reference number, and the overlapping explanation is omitted.

A communication monitoring system 20 according to the second example embodiment of the present invention is explained with reference to FIG. 3 to FIG. 6.

Figure 3:
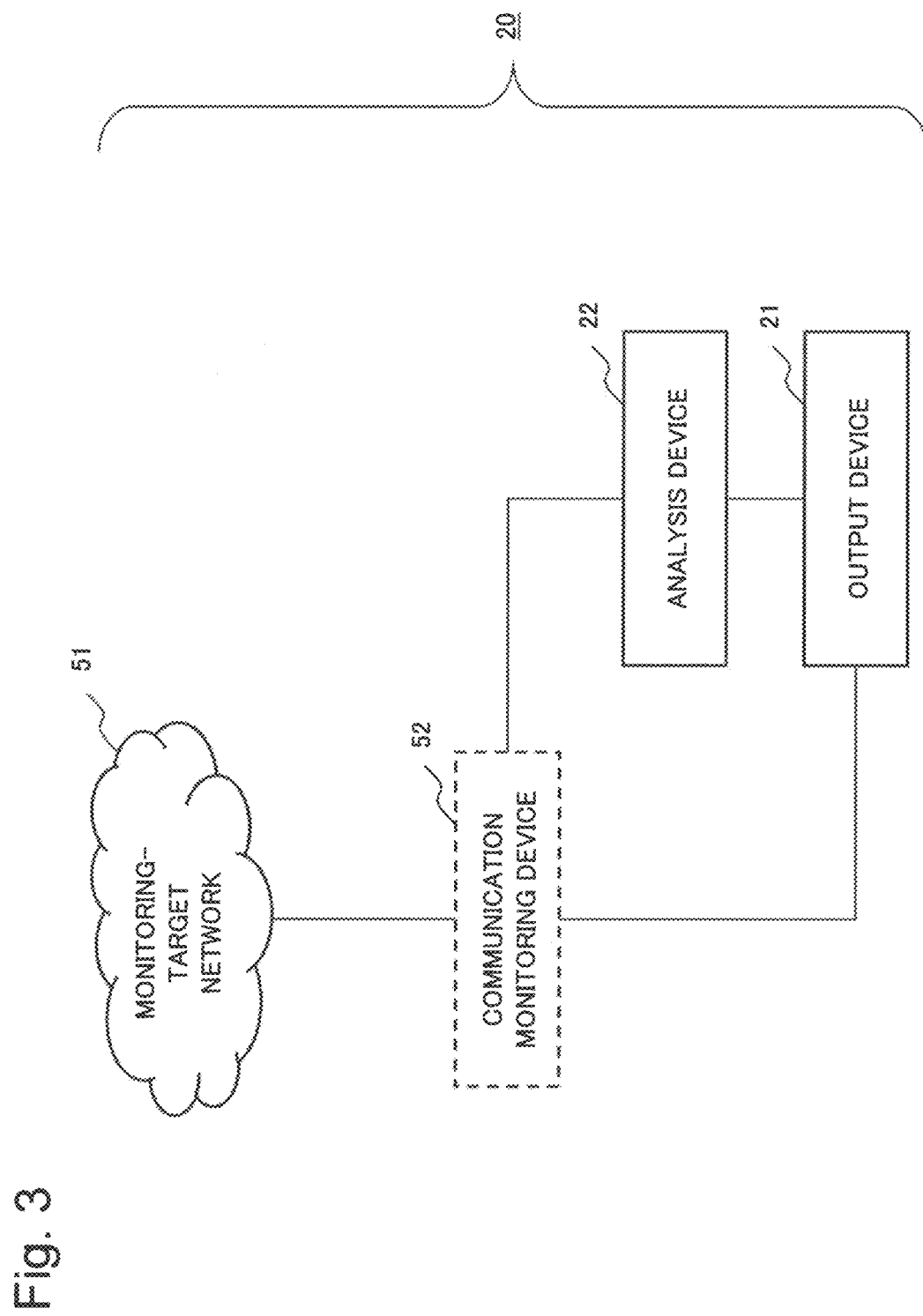
FIG. 3 is a block diagram illustrating a configuration of a communication monitoring system according to a second example embodiment of the present invention.
Figure 4:
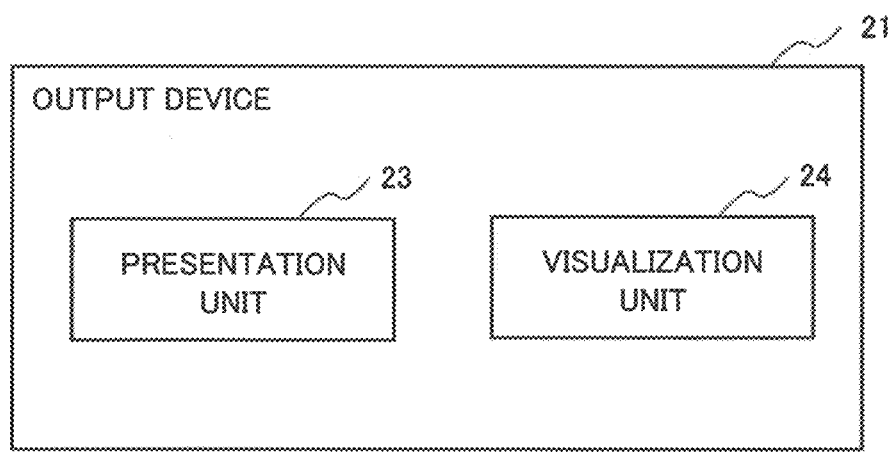
FIG. 4 is a block diagram illustrating a configuration of an output device according to the second example embodiment of the present invention.

FIG. 3 is a block diagram illustrating a configuration of the communication monitoring system 20 according to the second example embodiment of the present invention. FIG. 4 is a block diagram illustrating a configuration of an output device 21 according to the second example embodiment of the present invention.

In FIG. 3, the communication monitoring system 20 broadly includes the output device 21, an analysis device 22, the monitoring-target network 51, and a communication monitoring device 52. Also in FIG. 4, the output device 21 includes a presentation unit 23 and a visualization unit 24.

More specifically, the visualization unit 24 has a function of converting the digested information obtained by the analysis device 22 later described, into coloring information having high visibility. That is, the visualization unit 24 generates coloring information based on the digested information obtained by the analysis device 22.

The presentation unit 23 has a function of coloring the presentation area corresponding to the first alert, on the basis of the coloring information generated by the visualization unit 24, as similarity information. That is, the presentation unit 23 has a function of presenting the similarity information in a colored mode which can be identified by an operator.

FIG. 5 is a diagram specifically illustrating a mode in which information related to the alert is presented by the output device 23 according to the second example embodiment of the present invention. That is, FIG. 5 is a detected alert list 26 presented by the presentation unit 23.

More specifically, as illustrated in FIG. 5, the presentation unit 23 at least presents, for each alert, a part of the items included in the alert information and the similarity information. For example, as illustrated in FIG. 5, the presentation unit 23 may display, for each alert, a part of the items included in the alert information and the similarity information, at least on a user interface such as a display not illustrated in the drawings.

The similarity information illustrated in FIG. 5 is information representing the similarity between the first alert and the second alert that is similar to the first alert. More specifically, the similarity information includes a hash value that keeps a similarity and coloring information that keeps the similarity.

The hash value that keeps the similarity is for example a hash value that is obtained based on the payload included in the communication packet that has caused the first alert and the payload included in the communication packet that is related to the second alert, and that keeps the similarity between these payloads.

In FIG. 5, the first column represents the detection time. The second column represents the IP address of the transmission source host of communication information. The third column represents the IP address of the transmission destination host of the communication information. The fourth column represents a name of the detection rule, by which the detection rule can be identified (detection rule name). The fifth column represents the hash value as similarity information. That is, the fifth column represents the hash value obtained by the calculation unit 25 of the analysis device 22 later described. The sixth column represents the coloring information as similarity information. That is, the sixth column represents a mode in which a presentation area corresponding to the alert is colored on the basis of the coloring information according to the similarity.

More specifically, the hash value illustrated in FIG. 5 represents a four-byte value hexadecimally. The visualization unit 24 divides the hash value into bytes. The visualization unit 24 generates monochrome coloring information by setting the divided hash values as luminance information. The presentation unit 23 performs display on the presentation area of the "coloring information" illustrated in the sixth column on the basis of the generated coloring information.

The "coloring information" illustrated in FIG. 5 is divided into four presentation areas based on the divided hash values, for example. Therefore, if the divided hash values represent the same value, the presentation area will be colored in the same color.

Accordingly, the operator can visually recognize the similarity between the alerts by confirming the "coloring information."

In the present example embodiment, for facilitating the explanation, the visualization unit 24 is explained to have a configuration of generating monochrome coloring information based on the hash values, for example. However, the example embodiment of the present invention is not limited to the described configuration. The visualization unit 24 may adopt such a configuration that generates coloring information by interpreting a hash value in a format of RGB (Red, Green, Blue) 24 in a three-byte unit. Or, the visualization unit 24 may adopt such a configuration that generates coloring information by interpreting the hash value in a format of RGB 565 in a two-byte unit. In addition, the visualization unit 24 may adopt such a configuration that generates coloring information by using a value represented by HSV (Hue Saturation Value color model), not limited to RGB, for example. That is, the coloring information may be anything if the coloring information reflects the similarity represented by the hash value (hereinafter, the same applies to each example embodiment).

As an example, in the above-described present example embodiment, for facilitating the explanation, the presentation unit 23 is explained to have a configuration of presenting a part of the information included in the alert information and the similarity information, to the detected alert list 26 illustrated in FIG. 5. However, the example embodiment of the present invention is not limited to the described configuration. The presentation unit 23 may adopt such a configuration of presenting various types of information such as the port number of the transmission source host, in response to the operator's request, as an example.

Figure 6:
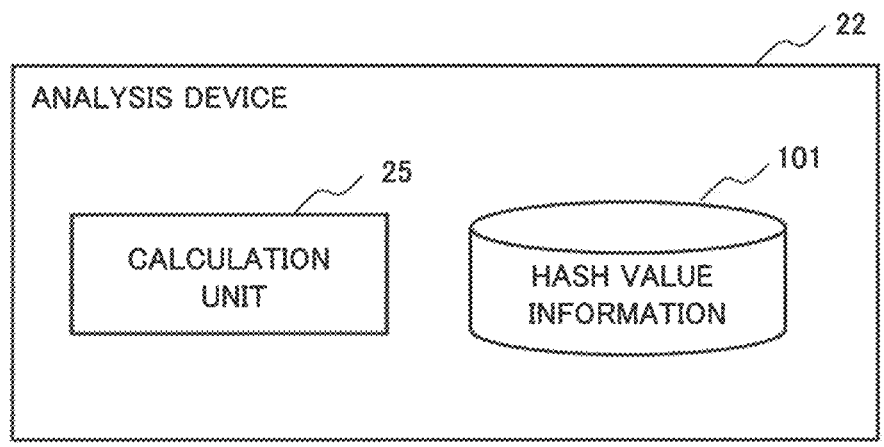
FIG. 6 is a block diagram illustrating a configuration of an analysis device according to the second example embodiment of the present invention.

The following explains the analysis device 22 with reference to FIG. 6.

FIG. 6 is a block diagram illustrating a configuration of the analysis device 22 according to the second example embodiment of the present invention. In FIG. 6, the analysis device 22 includes a calculation unit 25.

The calculation unit 25 has a function of obtaining digested information that is different from the second information and that is included in a form in which the similarity between the first information and the second information is digested, on the basis of information (the first information and the second information) included in the communication information. In addition, the calculation unit 25 has the function of associating the obtained digested information with the alert identifier that can identify the alert and storing them as hash value information 101.

For example, the hash value information 101 is stored in a storage device not illustrated in the drawing. In addition, the hash value information 101 stores therein the digested information obtained by the calculation unit 25 and the alert identifier in association with each other.

More specifically, the calculation unit 25 calculates the hash value based on the information (e.g., the payload of communication information) included in the communication information (e.g., the communication packet).

As a hash function (digest function) used for calculating the hash value, the following function is used instead of a generally-used hash function such as MD5. That is, a hash function that is characterized by generating hash values similar to each other for two similar payloads is used. Examples of such the hash function are locality sensitive hashing and fuzzy hashing. Therefore, the calculation unit 25 calculates the hash value using locality sensitive hashing or fuzzy hashing as the hash function. Here, MD5 is an abbreviated expression of Message Digest Algorithm 5.

More specifically, the locality sensitive hashing can be applied to an atypical byte string such as the payload. As such locality sensitive hashing, nilsimsa hash used to detect a spam mail may be adopted. As fuzzy hashing, ssdeep used to determine the similarity of malware may be adopted.

The calculation unit 25 may adopt any currently common technology as a technology to calculate the hash value using a hash function. Therefore, the detailed explanation of the present example embodiment is omitted (hereinafter, the same applies to each example embodiment).

In the above-described present example embodiment, for facilitating the explanation, the calculation unit 25 was explained as having a configuration of calculating the hash value based on the payload included in the IP packet, for example. However, the example embodiment of the present invention is not limited to the described configuration. The calculation unit 25 may adopt a configuration of calculating the hash value based on any binary string. In that case, the calculation unit 25 may use the entire packet including the packet header, for calculating the hash value.

If using a web application firewall, as the communication monitoring device 52, the calculation unit 25 may adopt a configuration of calculating the hash value based on the following information. That is, the calculation unit 25 may calculate the hash value based on the entirety of an HTTP (Hypertext Transport Protocol) request message or an HTTP response message. Alternatively, the calculation unit 25 may calculate the hash value based on the HTTP header portion or body portion, on condition that the HTTP request message or the HTTP response message are obtainable (hereinafter, the same applies to each example embodiment).

In the above-described present example embodiment, for facilitating the explanation, the output device 21 and the analysis device 22 are explained as being separate from each other, as an example. However, the example embodiment of the present invention is not limited to the described configuration. The output device 21 and the analysis device 22 may be configured in a same device. In such a case, the output device 21 may adopt a configuration of including the analysis device 22.

In this way, the output device 21 and the analysis device 22 according to the present example embodiment can achieve the effect explained in the first example embodiment, and can also present to an operator an alert in a more visible mode.

This is because the analysis device 22 includes the calculation unit 25 that obtains the hash value that keeps the similarity between payloads. In addition, the output device 21 includes the visualization unit 24 that converts the hash value obtained by the calculation unit 25 into coloring information. The presentation unit 23 can present to the operator information related to a highly visible alert on the basis of coloring information. Accordingly, the operator can visibly determine the similarity between the alerts. That is, the operator can visibly determine the similarity between the payloads associated with the alert. As a result, the operator can efficiently perform the operation to classify the alert during the operation.

Third Example Embodiment

Next, a third example embodiment based on the output device 21 according to the above-described second example embodiment of the present invention is explained. In the following explanation, the characteristic portions of the present example embodiment are mainly explained. In the following explanation, each configuration that is similar to the corresponding configuration of the above-described example embodiments is assigned the same reference number, and the overlapping explanation is omitted.

The communication monitoring system 30 according to the third example embodiment of the present invention is explained with reference to FIG. 7 to FIG. 13.

Figure 7:
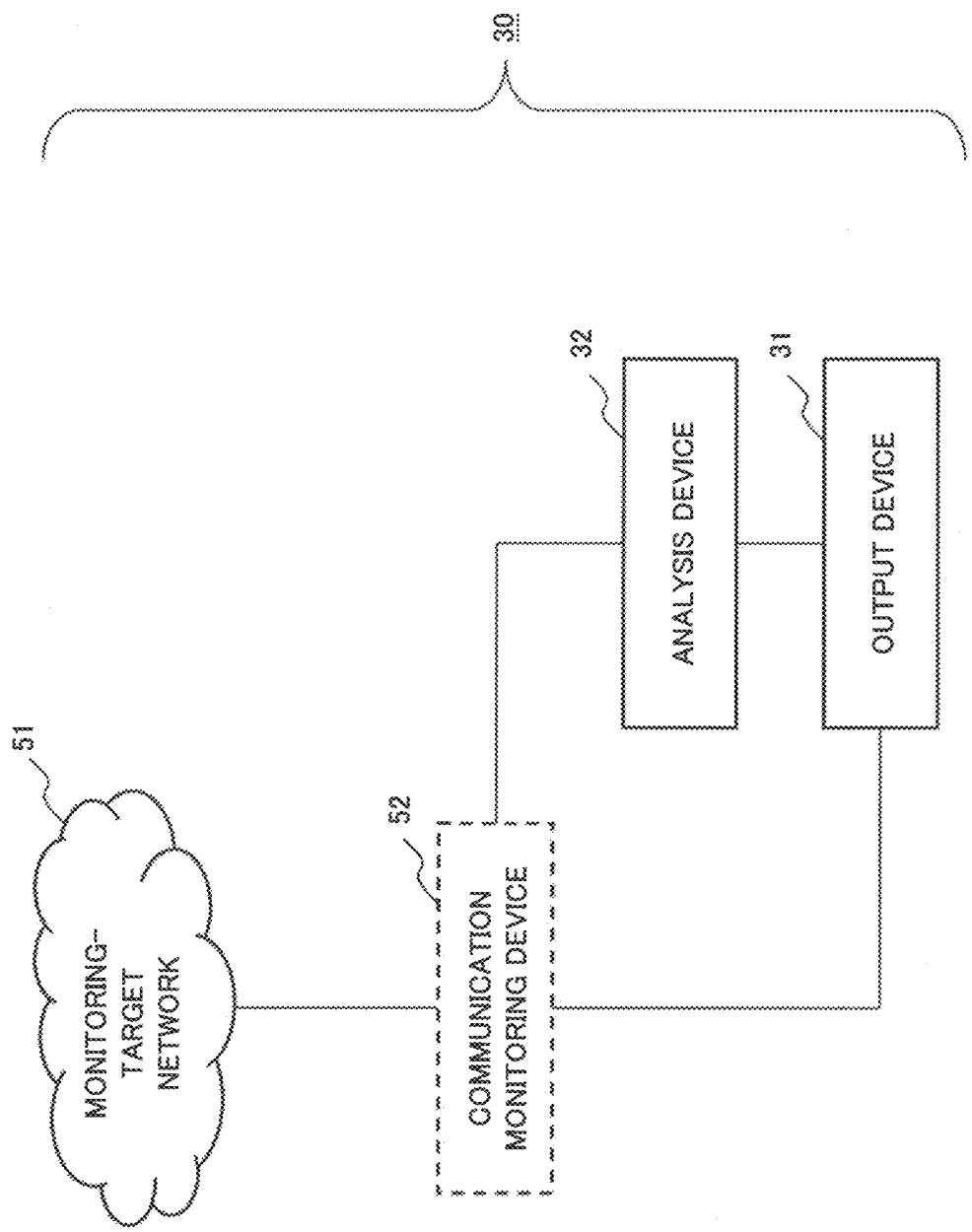
FIG. 7 is a block diagram illustrating a configuration of a communication monitoring system according to a third example embodiment of the present invention.
Figure 8:
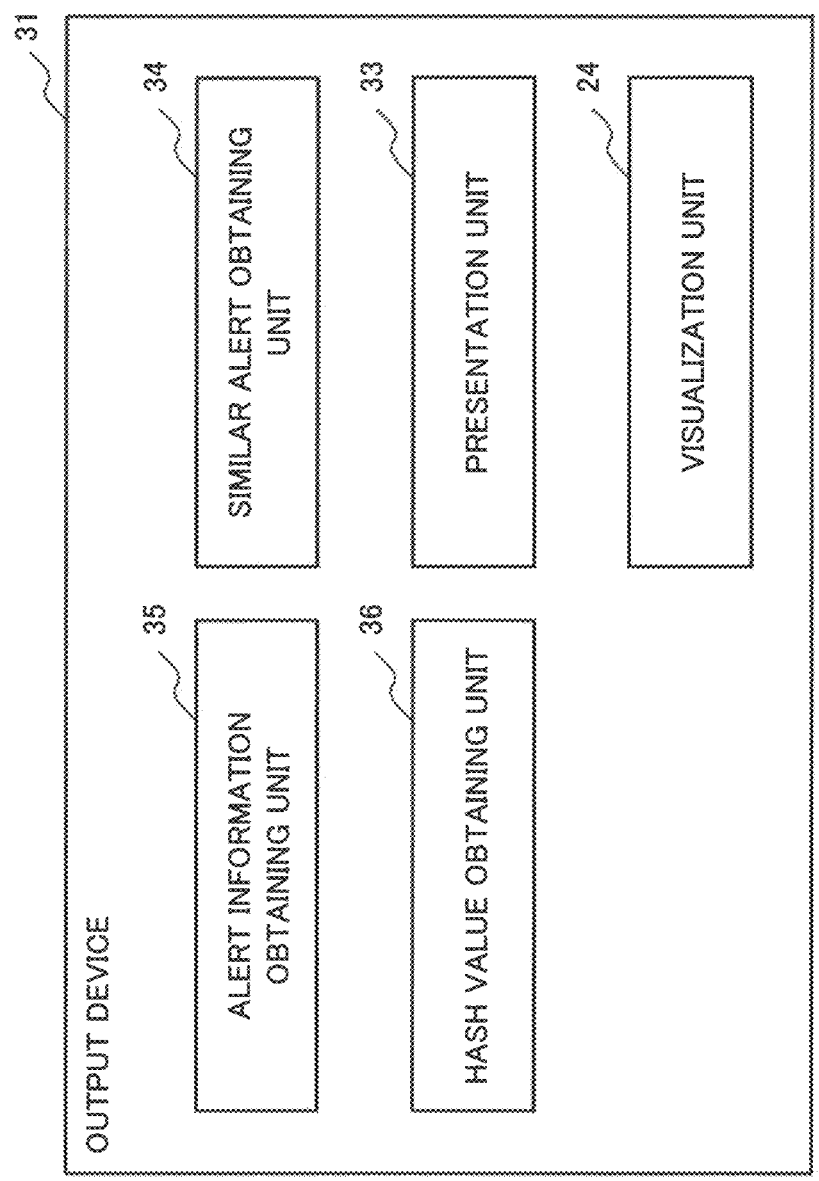
FIG. 8 is a block diagram illustrating a configuration of an output device according to the third example embodiment of the present invention.

FIG. 7 is a block diagram illustrating a configuration of the communication monitoring system 30 according to the third example embodiment of the present invention. FIG. 8 is a block diagram illustrating a configuration of an output device 31 according to the third example embodiment of the present invention.

In FIG. 7, the communication monitoring system 30 broadly includes the output device 31, an analysis device 32, the monitoring-target network 51, and the communication monitoring device 52. In FIG. 8, the output device 31 includes a presentation unit 33, a similar alert obtaining unit 34, an alert information obtaining unit 35, a hash value obtaining unit 36, and the visualization unit 24.

The output device 31 explained in the present example embodiment is different from the output device 21 in the configuration of including the similar alert obtaining unit 34 that requests analysis device 32 to extract the alert that is similar to a specific alert. In addition, the presentation unit 33 is different from the presentation unit 23 in the configuration of having a function of presenting information related to the similar alert extracted in response to a request.

The similar alert obtaining unit 34 has a function of executing the following process in response to receiving an instruction to designate the specific alert from operator. That is, the similar alert obtaining unit 34 requesting the extraction unit 37 to extract the alert that is similar to the specific alert. In addition, the similar alert obtaining unit 34 has a function of obtaining information (list) including the alert identifier of the similar alert from the extraction unit 37 having accepted the request.

The presentation unit 33 not only presents the alert information and the similarity information explained in each example embodiment, but also has a function of presenting information related to the specific alert and the alert that is similar to the specific alert.

The alert information obtaining unit 35 has a function of extracting alert information that matches the search condition, from among the alert information retained by the alert information 102 explained later.

The hash value obtaining unit 36 has a function of extracting the hash value that matches the alert identifier included in the alert information extracted by the alert information obtaining unit 35, from the hash value information 101.

In the present example embodiment, for facilitating the explanation, the alert information obtaining unit 35 and the hash value obtaining unit 36 have a configuration of extracting information, for example. However, the example embodiment of the present invention is not limited to the described configuration. The alert information obtaining unit 35 and the hash value obtaining unit 36 may adopt such a configuration of being provided with the information in response to a request.

Figure 9:
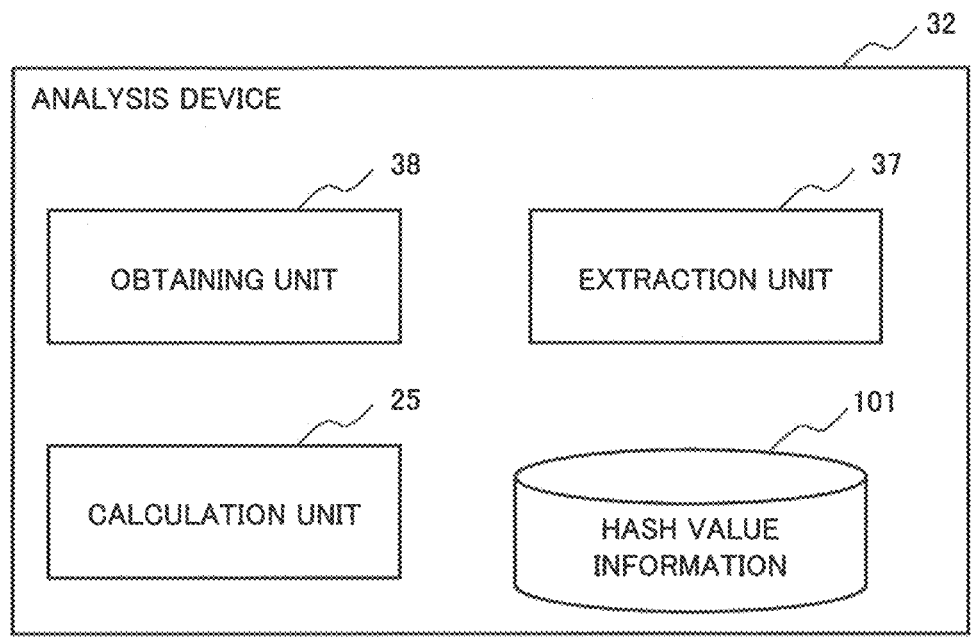
FIG. 9 is a block diagram illustrating a configuration of an analysis device according to the third example embodiment of the present invention.

The following explains the analysis device 32 with reference to FIG. 9. FIG. 9 is a block diagram illustrating a configuration of the analysis device 32 according to the third example embodiment of the present invention.

In FIG. 9, the analysis device 32 includes the calculation unit 25, an extraction unit 37, and an obtaining unit 38.

The analysis device 32 explained in the present example embodiment is different from the analysis device 22 in the configuration of including an extraction unit 37 that extracts the alert that is similar to the specific alert and generates information related to the extracted alert.

The extraction unit 37 extracts the alert that is similar to the specific alert. The extraction unit 37 has a function of generating information (list) related to the extracted alert. Note that the process to generate the list by the extraction unit 37 is explained later in detail in the present example embodiment.

The obtaining unit 38 has a function of obtaining, from the communication monitoring device 52, the alert information retained in the alert information 102 and the payload information retained in the payload information 103 that are detailed later, in the order of detection time. That is, the obtaining unit 38 obtains, from the communication monitoring device 52, alert information retained in the alert information 102 in the order of detection time. The obtaining unit 38 obtains, from the communication monitoring device 52, payload information retained in the payload information 103 in the order of detection time.

Figure 10:
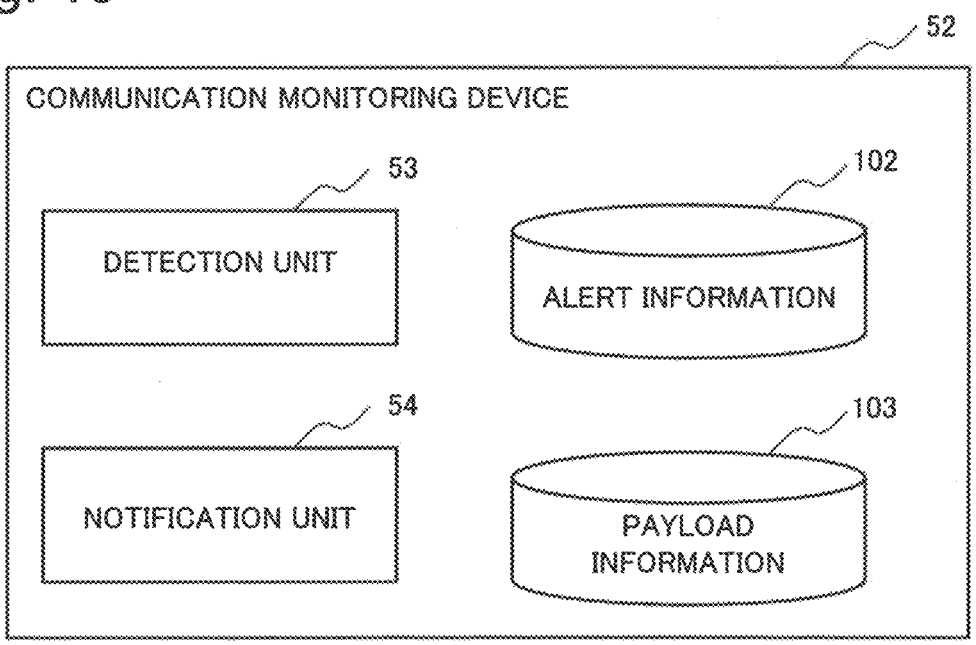
FIG. 10 is a block diagram illustrating a configuration of a communication monitoring device according to the third example embodiment of the present invention.

In the following explanation, the communication monitoring device 52 is described with reference to FIG. 10. FIG. 10 is a block diagram illustrating a configuration of the communication monitoring device 52 according to the third example embodiment of the present invention.

In FIG. 10, the communication monitoring device 52 includes a detection unit 53 and a notification unit 54. The alert information 102 and the payload information 103 are stored in a storage device not illustrated in the drawing.

In the following explanation, for facilitating the explanation, a configuration of using the IDS as the communication monitoring device 52 is used as an example. However, the example embodiment of the present invention is not limited to the described configuration. The communication monitoring device 52 detects the abnormality in the network 51 or the attack directed to the network 51. The communication monitoring device 52 notifies the detected attack as an alert. The communication monitoring device 52 may adopt a configuration of using a communication monitoring device that can store, as an evidence, the alert together with information associated with identification information (ID) representing the detected attack.

The detection unit 53 has a function of monitoring the communication packet flowing through the network 51. More specifically, the detection unit 53 detects the abnormality such as the attack from outside and directed to the network 51 on the basis of the detection rule, for example.

Then, in response to detecting the attack, the detection unit 53 stores alert information in the alert information 102. In addition, the detection unit 53 stores the payload included in the communication packet and the alert identifier, as the payload information 103.

Here, the alert information 102 includes, for each alert, information in which the detection time, the identifier of the detection rule, the IP address and the port number of the transmission source, the IP address and the port number of the transmission destination host are associated with each other, by using the alert identifier as a key.

In addition, the payload information 103 includes, for each alert, information in which the alert identifier and the payload are associated with each other. That is, the payload information 103 is stored associated with correspondence relation between the payload and the alert information retained in the alert information 102.

The notification unit 54 notifies the analysis device 32 of the alert indicating that the detection unit 53 detected the attack at the time of the detection.

In the following explanation, the operation of the communication monitoring system 30 according to the present example embodiment is explained in greater detail.

Figure 11:
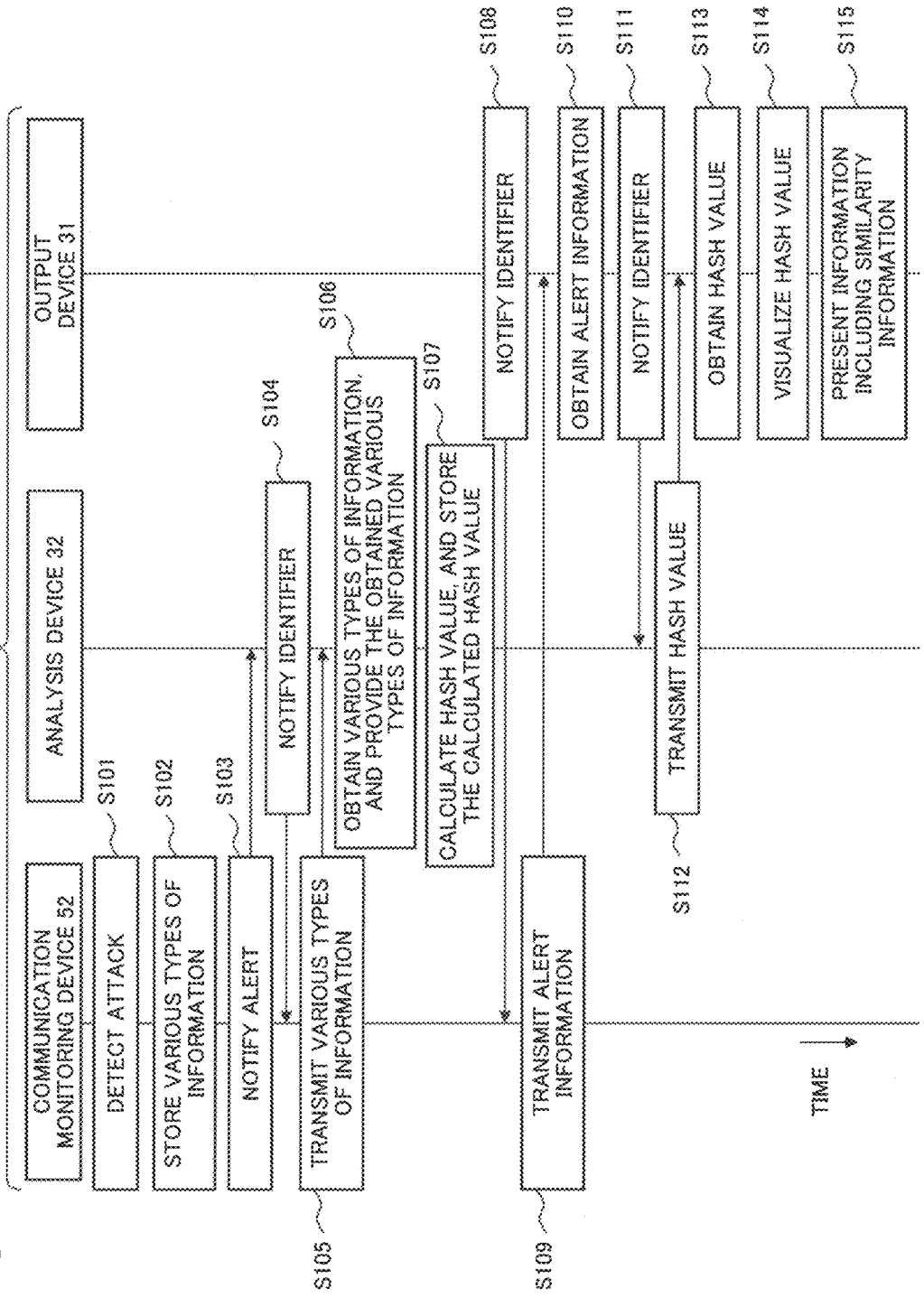
FIG. 11 is a sequence diagram (flowchart) illustrating an operation to present information related to an alert, which is performed by the communication monitoring system according to the third example embodiment of the present invention.

FIG. 11 is a sequence diagram (flowchart) illustrating an operation to present information related to the alert, which is performed by the communication monitoring system 30 according to the third example embodiment of the present invention. The operational procedure performed by the communication monitoring system 30 is explained according to the flowchart.

In the following explanation, for facilitating the explanation, the analysis device 32 is assumed to calculate the hash value based on the information (e.g., a payload of a communication packet) constituting the communication information (e.g., a communication packet), as an example.

For facilitating the explanation, the communication monitoring system 30 is explained taking the above-described configuration as an example. However, the present invention explained taking the present example embodiment as an example is not limited to the above-described configuration.

The detection unit 53 of the communication monitoring device 52 detects the attack directed to the network 51 on the basis of the detection rule (Step S101). The detection unit 53 stores alert information into the alert information 102, when having detected the attack. In addition, the detection unit 53 stores the payload included in the communication packet having caused the first alert, as the payload information 103 (Step S102).

More specifically, the detection unit 53 stores the alert information 102 at least in association with the following information.

Alert identifier,
Detection time,
Identifier that can identify the detection rule,
IP address and port number of the transmission source of communication information having caused an abnormality,
IP address and port number of the transmission destination host of the communication information When the detection unit 52 detects the attack, the notification unit 54 of the communication monitoring device 52 notifies the analysis device 32 that a new abnormality has been detected, as a first alert (Step S103).

The analysis device 32 receives the first alert notified by the notification unit 54. The obtaining unit 38 of the analysis device 32 extracts alert information from the alert information 102. Then, the obtaining unit 38 extracts the payload from the payload information 103.

In that case, all the alert information on or after the designated time may be designated as alert information to be extracted. The designation of alert information to be extracted may be configured so that alert information be extracted in the following processes. That is, the notification unit 54 notifies the obtaining unit 38 of the alert identifier of the newly notified first alert. For extracting alert information, the obtaining unit 38 may extract alert information by designating the alert identifier notified by the notification unit 54. Alternatively, the notification unit 54, when making a notification to the analysis device 32 in Step S103, may notify the alert information and the payload by including them in that notification. Accordingly, the obtaining unit 38 may extract the alert information and the payload information included in the notification.

More specifically, as an example, the obtaining unit 38 notifies the communication monitoring device 52 of the alert identifier of the first alert (Step S104). The communication monitoring device 52 transmits, to the obtaining unit 38, the alert information obtained based on the notified alert identifier and the payload by including them in the response (Step S105). The obtaining unit 38 obtains the alert information and the payload from the communication monitoring device 52. In addition, the obtaining unit 38 provides the alert information and the payload having been obtained, to the calculation unit 25 of the analysis device 32, as an input (Step S106).

The calculation unit 25 calculates the hash value upon receiving the alert information and the payload as an input. In addition, the calculation unit 25 stores the calculated hash value and the alert identifier included in the alert information in association with each other, as the hash value information 101 (Step S107).

Accordingly, the calculated hash value can be referenced by the output device 31.

The output device 31 starts the processes when triggered by the operator's operation. That is, the alert information obtaining unit 35 of the output device 31 extracts alert information from the alert information 102. Furthermore, the hash value obtaining unit 36 of the output device 31 extracts the hash value associated with the alert identifier, from the hash value information 101, based on the alert identifier included in the extracted alert information.

More specifically, the alert information obtaining unit 35 notifies the communication monitoring device 52 of the alert identifier of the first alert having been notified, for example (Step S108). The communication monitoring device 52 transmits, to the alert information obtaining unit 35, the alert information obtained based on the notified alert identifier by including it in the response (Step S109). The alert information obtaining unit 35 obtains the alert information from the communication monitoring device 52 (Step S110).

The hash value obtaining unit 36 notifies the analysis device 32 of the alert identifier included in the obtained alert information (Step S111). The analysis device 32 transmits, to the hash value obtaining unit 36, the hash value obtained based on the notified alert identifier, by including it in the response (Step S112). The hash value obtaining unit 36 obtains the hash value from the analysis device 32 (Step S113).

The visualization unit 24 generates coloring information from the obtained hash value (Step S114). The presentation unit 33 presents the obtained alert information, the hash value of the payload, and the coloring information, in a mode in which the operator can identify them. That is, the presentation unit 33 displays the detected alert list 26 illustrated in FIG. 5, for example (Step S115).

By doing so, the presentation unit 33 can display the alert information and the similarity information, in a mode in which the operator can identify the information, as information related to the first alert.

In the following explanation, an operation in the case in which the specific first alert is designated from among the alerts in the detected alert list 26 presented in Step S115 in FIG. 11 is explained, as an example.

Figure 12:
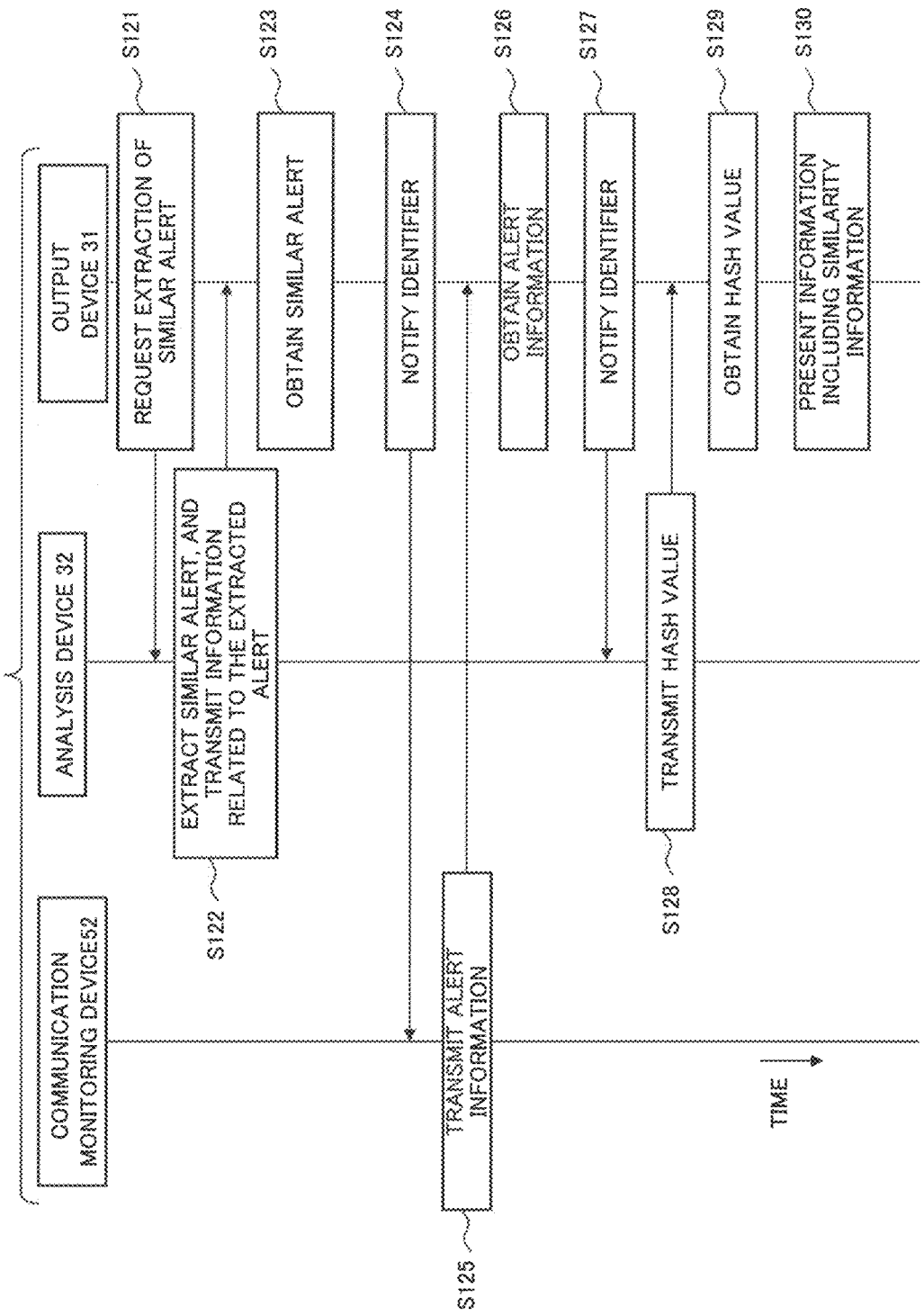
FIG. 12 is a sequence diagram (flowchart) illustrating an operation to present information related to an alert that is similar to a specific alert, which is performed by the communication monitoring system according to the third example embodiment of the present invention.

FIG. 12 is a sequence diagram illustrating a sequence diagram (flowchart) illustrating an operation to present information related to an alert that is similar to the specific alert, which is performed by the communication monitoring system 30 according to the third example embodiment of the present invention. The operational procedure of the communication monitoring system 30 is explained according to the flowchart.

In the following explanation, a specific first alert is assumed to be designated by an operator from among the plurality of alerts included in the detected alert list 26, for example.

For facilitating the explanation, the communication monitoring system 30 is explained by taking the above-described configuration as an example; however, the present invention explained taking the present example embodiment as an example is not limited to the above-described configuration.

The similar alert obtaining unit 34 of the output device 31 performs the following processes in response to the designation of the specific first alert by the operator, for example. The similar alert obtaining unit 34 requests the extraction unit 37 of the analysis device 32 to extract the second alert that is similar to the designated first alert. That is, the similar alert obtaining unit 34 transmits, to the extraction unit 37, an extraction request (extraction demand) including the alert identifier of the designated first alert (Step S121).

For example, "designation" means to select a specific desired first alert from among the plurality of alerts included in the detected alert list 26 displayed on the user interface, by the operator's operation of the input device (not illustrated in the drawing).

The extraction unit 37 accepts the extraction request of the similar alert obtaining unit 34. The extraction unit 37 refers to the hash value information 101 based on the alert identifier of the designated first alert. The extraction unit 37 extracts, from the hash value information 101, the hash value that is similar to the hash value associated with that alert identifier, and the alert identifier of the second alert associated with the similar hash value.

During this operation, the extraction unit 37, based on the hash value of the designated first alert and the hash value of the extracted second alert, obtains the distance between these hash values. That is, the extraction unit 37 obtains the distance representing the similarity between the payload to the first alert and the payload to the extracted second alert. In other words, the extraction unit 37 obtains the distance representing the similarity between the specific first alert and the extracted second alert.

In addition, the extraction unit 37 transmits the list including the identifier of the extracted second alert and the obtained distance to the similar alert obtaining unit 34, as a response to the extraction request (Step S122).

During this operation, the extraction unit 37 incorporates, in the list, the obtained distances and the identifiers of the second alerts whose obtained distances satisfy the predetermined condition, in ascending order of the obtained distances. The extraction unit 37 transmits this list as a response to the extraction request. In other words, the extraction unit 37 sorts in the order of shorter obtained distances (i.e., in the order of greater similarity levels), and excludes any alert of which the value of the obtained distance is greater than a pre-set threshold value.

In the present example embodiment, for facilitating the explanation, the above explained that the extraction unit 37 has a configuration of determining the similarity between the payloads by using the distance between the hash values, as an example. However, the example embodiment of the present invention is not limited to the described configuration. The extraction unit 37 may directly obtain the distance between the payloads by means of an editing distance and the like. However, in that case, the cost generated for distance calculation is likely higher. In view of this, the extraction unit 37 may set, as a target of distance calculation, the alert whose distance between the hash values is equal to or smaller than the threshold value. Alternatively, the extraction unit 37 may set the alert of which the distance between the hash values is closer and which is positioned in a higher order, as a target of distance calculation. By doing so, the extraction unit 37 can restrain the number of alerts that are the targets of distance calculation.

The similar alert obtaining unit 34 of the output device 31 obtains the list from the extraction unit 37, as a response to the extraction request (Step S123). The alert information obtaining unit 35 of the output device 31 notifies the communication monitoring device 52 of the alert identifier included in the list, in response to the reception by the similar alert obtaining unit 34 of the response from the extraction unit 37 (Step S124). The communication monitoring device 52 incorporates, in the response, the alert information obtained based on the notified alert identifier. The communication monitoring device 52 transmits that response to the alert information obtaining unit 35 (Step S125). In addition, the alert information obtaining unit 35 receives the response from the communication monitoring device 52, and obtains the alert information associated with the alert identifier (Step S126).

Furthermore, the hash value obtaining unit 36 of the output device 31 notifies the analysis device 32 of the alert identifier included in the alert information obtained by the alert information obtaining unit 35 (Step S127). The analysis device 32 incorporates the hash value obtained based on the notified alert identifier in a response and transmits the response to the hash value obtaining unit 36 (Step S128). The hash value obtaining unit 36 obtains the hash value associated with that alert identifier, from the analysis device 32 (Step S129).

The presentation unit 33 presents the following information in a mode in which an operator can identify the information.

The alert information, the hash value, and the distance, as information related to the specific first alert
  The alert information, the hash value, and the distance, as information related to the second alert that is similar to that first alert That is, the presentation unit 33 presents the above-described information as a detected alert list 39 illustrated in FIG. 13 (Step S130).

FIG. 13 is a diagram specifically illustrating a mode in which information related to the alert is presented by the presentation unit 33 according to the third example embodiment of the present invention, and is the detected alert list 39 presented by the presentation unit 33. More specifically, as illustrated in FIG. 13, the presentation unit 33 presents at least a part of the items included in the alert information and the similarity information, for each alert.

The similarity information illustrated in FIG. 13 is information representing hash values of the first alert and of the second alert that is similar to that first alert, and the distance between the hash value of the first alert and the hash value of the second alert.

In the detected alert list 39 represented in a table format in FIG. 13, the first column represents the detection time. The second column represents the IP address of the transmission source host of communication information. The third column represent the IP address of the transmission source host of communication information. The fourth column represents the name of the detection rule, by which the detection rule can be identified (detection rule name). The fifth column represents the hash value as similarity information. The sixth column represents the distance obtained by the extraction unit 37, as similarity information.

More specifically, the hash value illustrated in FIG. 13 represents a four-byte value hexadecimally, just as in FIG. 5. As an example, the sixth column represents a result using a hamming distance when assuming the hash value to be a bit string having a length of 32. However, the distance function used in calculating the hash value distance is not limited to the hamming distance. An edit distance between the hash values that are regarded as byte strings may be used as the distance function.

In the detected alert list 39 illustrated in a table format in FIG. 13, the first row represents the alert designated by the operator. The second row and the rows thereafter display alerts similar to the designated alert. That is, the second row and the rows thereafter display alerts in ascending order of the distance from the designated alert.

For facilitating the explanation, the detected alert list 39 illustrated in FIG. 13 omitted presentation of coloring information. However, the example embodiment of the present invention is not limited to the described configuration. The presentation unit 33 may present the detected alert list 39 incorporating therein coloring information.

In the above-described present example embodiment, for facilitating the explanation, the extraction unit 37 is explained to have a configuration of extracting the similar alert by only using the distance between the hash values, for example. However, the example embodiment of the present invention is not limited to the described configuration. The extraction unit 37 can also use, in the distance calculation, the items included in the alert information not only the obtained distance. In that case, the extraction unit 37 calculates the distance based on the match or similarity of the IP address, the port number, and the detection rule included in the alert information, for example. The extraction unit 37 may also use a distance obtained by a weighted sum between the distance obtained based on the hash value and the distance obtained based on the information included in the alert information.

Accordingly, the extraction unit 37 can extract alerts taking into consideration the determination based on the match or similarity of the IP addresses and the port numbers. Therefore, the output device 31 can present a more practical determination criterion than presenting the distance obtained by one of the methods.

In this way, the output device 31 and the analysis device 32 according to the present example embodiment can achieve the effect explained in each of the example embodiments, and can present to an operator an alert in a mode in which the alert can be more efficiently determined. The reason therefor is described as follows.

That is, the output device 31 includes the presentation unit 33 that presents the alert whose payload is similar to that of the alert designated by the operator, together with the distance from the designated alert. In addition, the analysis device 32 includes the extraction unit 37 that extracts the alert that is similar to the designated alert. As a result, the operator can efficiently find the alert whose payload is similar, from the alerts having been generated in the past. Furthermore, the output device 31 structures the classification result of the similar alerts having been generated in the past so that it can be referred to. As a result, the operator can grasp the classification tendency of similar alerts. That is, the output device 31 can efficiently assist alert classification determination in the alert classification operation by an operator.

(Hardware Configuration Examples)

Each unit illustrated in the drawings related to the above-described example embodiment can be interpreted as a functional unit of a software program (processing unit, software module). Each of these software modules may be realized by dedicated hardware. However, classification of each unit illustrated in these drawings is a configuration for facilitating the explanation, and various configurations can be considered in implementation. An example hardware environment in this case is explained with reference to FIG. 14. Note that the directions of the arrows in FIG. 14 are an example, and do not limit the directions of the signals between the blocks.

Figure 14:
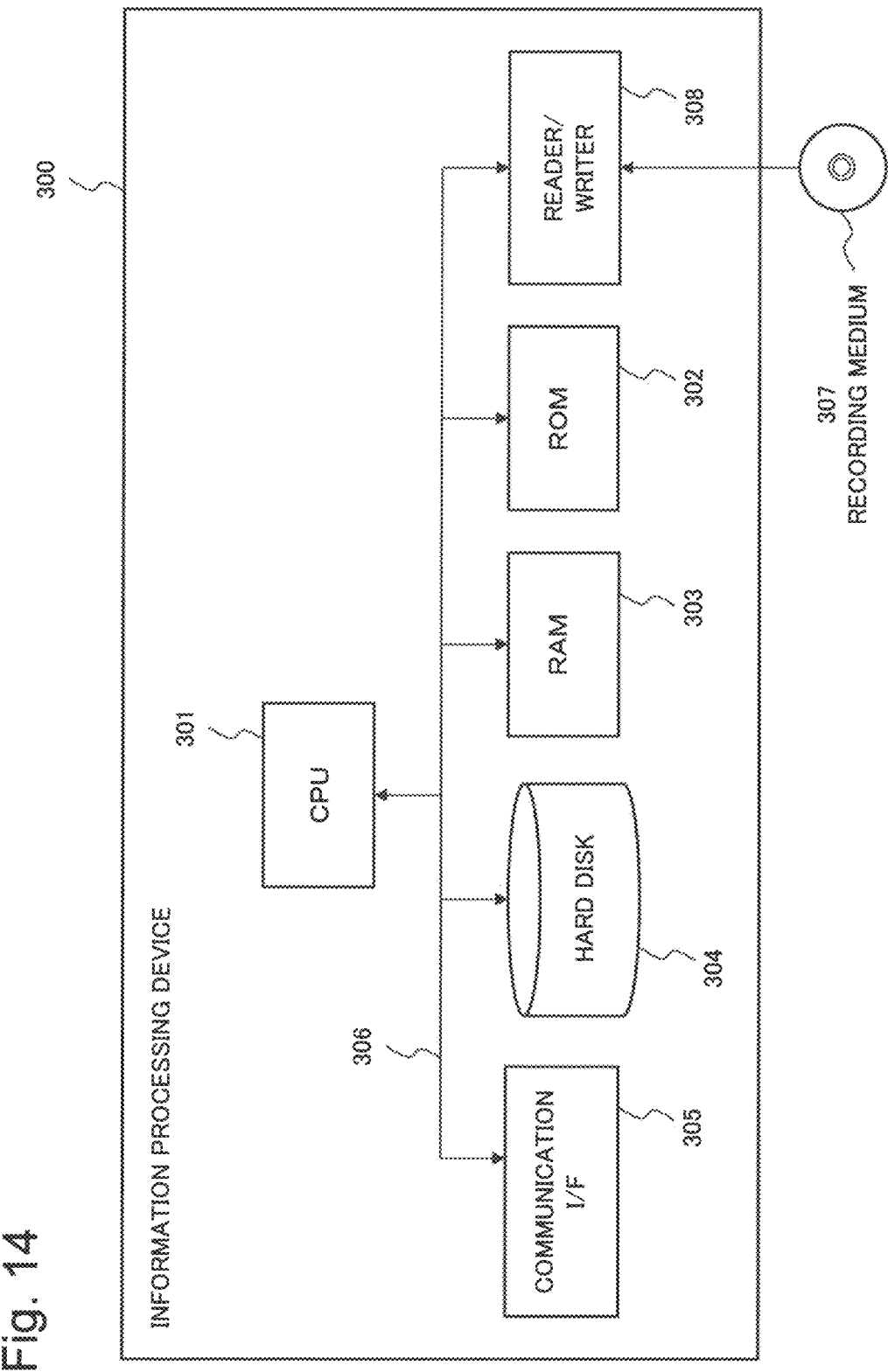
FIG. 14 is a block diagram illustratively explaining a hardware configuration of an information processing device that can realize each example embodiment of the present invention.

FIG. 14 is a diagram illustratively explaining a configuration of an information processing device (computer) 300 that can realize a output device and an analysis device according to an example embodiment of the present invention. That is, FIG. 14 illustrates a configuration of a computer such as a server (information processing device), which is a hardware environment in which each function in the above-described example embodiments can be realized. This computer can realize all or a part of the functions of the output device 1 (FIG. 1 and FIG. 2), the output device 21 (FIG. 3 and FIG. 4), the output device 31 (FIG. 7 and FIG. 8), the analysis device 22 (FIG. 3 and FIG. 6), or the analysis device 32 (FIG. 7 and FIG. 9).

The information processing device 300 illustrated in FIG. 14 is a typical computer in which the following components are connected via a bus (communication line) 306.

CPU (Central_Processing_Unit) 301
    ROM (Read_Only_Memory) 302
    RAM (Random_Access_Memory) 303
    Hard disk 304 (storage device)
    Communication interface with an external device (In FIG. 14, this is illustrated as a communication "I/F" (interface)) 305
    Reader/writer 308 that can read and write date stored in the recording medium 307 such as CD-ROM (Compact_Disc_Read_Only_Memory)

For example, each configuration of the above-described information processing device 300 can at least realize a function of displaying various types of information to be presented by the output device (the output device 1, the output device 21, and the output device 31) on a user interface such as a display not illustrated in the drawing.

The present invention explained by taking the above-described example embodiments as examples can be realized by the following procedures. That is, a computer program that can realize the functions illustrated in the block configuration diagrams (FIG. 1 to FIG. 4, FIG. 6 to FIG. 9) or the flowcharts (FIG. 11, FIG. 12) which are referred to in the respective example embodiments is supplied to the information processing device 300 illustrated in FIG. 14. Thereafter, the computer program is read and executed by the CPU 301 of the hardware, thereby realizing the present invention. In addition, the computer program supplied in that device may be stored in a non-volatile storage device such as readable/writable transitory storage memory (RAM 303) or a hard disk 304.

In the former case, a currently common procedure can be adopted as a method of supplying a computer program to the hardware. For example, the supply method may be a method of installation in the device via various types of recording media 307 such as CD-ROM, and a method of downloading from outside via a communication line such as the Internet. In such cases, the present invention can be interpreted as being configured by a code constituting such a computer program or a recording medium in which such a code is stored.

So far, the present invention has been explained by way of the example embodiments. However, the present invention is not limited to the above-described example embodiments. Various changes which can be understood by those skilled in the art can be made to the configuration and the details of the present invention within the scope of the present invention.

The present application claims priority of Japanese Patent Application No. 2014-249567 filed on Dec. 10, 2014, the entire disclosure of which is incorporated herein.

REFERENCE SIGNS LIST

1 Output device
2 Presentation unit
10 Communication monitoring system
20 Communication monitoring system
21 Output device
22 Analysis device
23 Presentation unit
24 Visualization unit
25 Calculation unit
26 Detected alert list
30 Communication monitoring system
31 Output device
32 Analysis device
33 Presentation unit
34 Similar alert obtaining unit
35 Alert information obtaining unit
36 Hash value obtaining unit
37 Extraction unit
38 Obtaining unit
39 Detected alert list
51 Monitoring-target network
52 Communication monitoring device
53 Detection unit
54 Notification unit
101 Hash value information
102 Alert information
103 Payload information
300 Information processing device
301 CPU
302 ROM
303 RAM
304 Hard disk
305 Communication interface
306 Bus
307 Recording medium
308 Reader/writer

What is claimed is:

1. An output device comprising:
a presentation unit, implemented by hardware including a processor and memory, for presenting similarity information that is obtained based on a first payload included in a first communication packet that has caused a first alert which a communication monitoring device outputs according to detection of an abnormality in a communication network to be monitored and a second payload included in a second communication packet related to one or more second alerts having been output prior to the first alert, the similarity information representing a similarity between the first alert and the second alert, wherein
the presentation unit presents, as the similarity information, hash values respectively obtained based on the first payload and the second payload, wherein the hash values differ from first payload and the second payload, and the hash values include the similarity between the first payload and the second payload, and
the hash values are calculated by hash function generating hash values similar to each other for two payloads similar to each other; and
an analysis unit, implemented by the hardware, for obtaining the hash values obtained based on the first payload and the second payload, wherein
the analysis unit extracts the second alert that is similar to a specific first alert based on hash value of the specific first alert and hash values of the second alert, and obtains the similarity information between the specific first alert and the extracted second alert,
the presentation unit presents the similarity information obtained by the analysis unit,
the analysis unit obtains a distance representing the similarity between hash values of the specific first alert and each of hash values of the second alerts, and generates information that includes the obtained distance and an identifier of each of the second alerts whose obtained distance satisfies a predetermined condition, in ascending order of the obtained distance,
the presentation unit presents the similarity information between the specific first alert and the second alert, in ascending order of the obtained distance, based on the information generated by the analysis unit, and
the presentation unit generates coloring information based on the hash values obtained by dividing each hash value into a plurality of bytes and setting the divided hash values as luminance of the coloring information, and presents the similarity information in a mode identifiable by an operator coloring a presentation area corresponding to the first alert based on the coloring information.

2. An analysis device comprising:
hardware, including a processor and memory;
analysis unit implemented at least by the hardware and that obtains hash values that include a similarity between a first payload and a second payload in a digested form and is different from the first payload and the second payload respectively, based on the first information and the second information, wherein
the first payload is included in a first communication packet that has caused a first alert that a communication monitoring device outputs according to detection of an abnormality in a communication network to be monitored, and the second payload is included in a second communication packet related to one or more second alerts having been output prior to the first alert,
the analysis unit calculates the hash values by hash function generating the hash values similar to each other for two payloads similar to each other,
the analysis unit extracts the second alert that is similar to a specific first alert based on hash value of the specific first alert and hash values of the second alert, and obtains the similarity information between the specific first alert and the extracted second alert,
the analysis unit obtains a distance representing the similarity between hash values of the specific first alert and each of hash values of the second alerts, and generates information that includes the obtained distance and an identifier of each of the second alerts whose obtained distance satisfies a predetermined condition, in ascending order of the obtained distance;
a presentation unit implemented at least by the hardware and that presents the similarity information between the specific first alert and the second alert, in ascending order of the obtained distance, based on the information generated by the analysis unit, wherein
the presentation unit generates coloring information based on the hash values obtained by dividing each hash value into a plurality of bytes and setting the divided hash values as luminance of the coloring information, and presents the similarity information in a mode identifiable by an operator coloring a presentation area corresponding to the first alert based on the coloring information.

3. A non-transitory recording medium storing a computer program making a computer realize a function of:
presenting similarity information that is obtained based on first payload included in a first communication packet that has caused a first alert that a communication monitoring device outputs according to detection of an abnormality in a communication network to be monitored and a second payload included in a second communication packet related to one or more second alerts having been output prior to the first alert, the similarity information representing a similarity between the first alert and the second alert, wherein
the similarity information is presented hash values respectively obtained based on the first payload and the second payload, wherein the hash values differs from the first payload and the second payload, and the hash values include the similarity between the first payload and the second payload,
the hash values are calculated by hash function generating hash values similar to each other for two payloads similar to each other;
obtaining the hash values obtained based on the first payload and the second payload;
extracting the second alert that is similar to a specific first alert based on hash value of the specific first alert and hash values of the second alert, and obtaining the similarity information between the specific first alert and the extracted second alert; and
obtaining a distance representing the similarity between hash values of the specific first alert and each of hash values of the second alerts, and generates information that includes the obtained distance and an identifier of each of the second alerts whose obtained distance satisfies a predetermined condition, in ascending order of the obtained distance, and
wherein the similarity information is presented between the specific first alert and the second alert, in ascending order of the obtained distance, including generating coloring information based on the hash values obtained by dividing each hash value into a plurality of bytes and setting the divided hash values as luminance of the coloring information, and presenting the similarity information in a mode identifiable by an operator coloring a presentation area corresponding to the first alert based on the coloring information.

* * * * *